A. W. BURKE.
MULTIRATE ELECTRIC METER.
APPLICATION FILED MAR. 11, 1912.

1,082,148.

Patented Dec. 23, 1913.

UNITED STATES PATENT OFFICE.

ALFRED W. BURKE, OF WILKINSBURG, PENNSYLVANIA.

MULTIRATE ELECTRIC METER.

1,082,148.  Specification of Letters Patent.  Patented Dec. 23, 1913.

Application filed March 11, 1912. Serial No. 682,885.

*To all whom it may concern:*

Be it known that I, ALFRED W. BURKE, a subject of the King of Great Britain, residing at Wilkinsburg, in the county of Allegheny and State of Pennsylvania, have invented certain new and useful Improvements in Multirate Electric Meters, of which the following is a specification.

This invention is a recording watt-meter for alternating electric currents provided with means, controlled from some central point, whereby the meter of each individual consumer may be caused to run and register at different rates at different times.

The invention is applicable to a meter of the induction type, having a short series or current-coil of low resistance and a long shunt or potential coil of high resistance. The reading of such a meter depends on the amounts of current simultaneously traversing these shunt and series coils, and the shunt-coil is normally subject to the full voltage on the line. According to the present invention, the rate of the meter is varied by varying the voltage impressed on its shunt-coil, that is by either adding to or subtracting from the normal line voltage impressed upon it.

Figure 1:
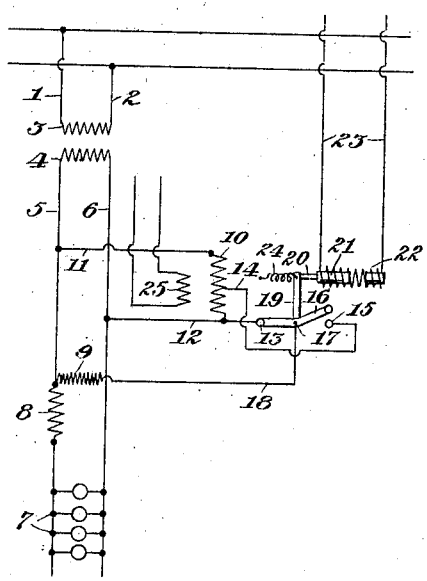
Figure 2:
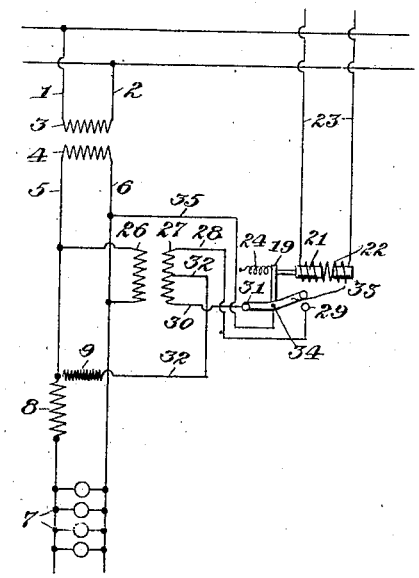
Figure 3:
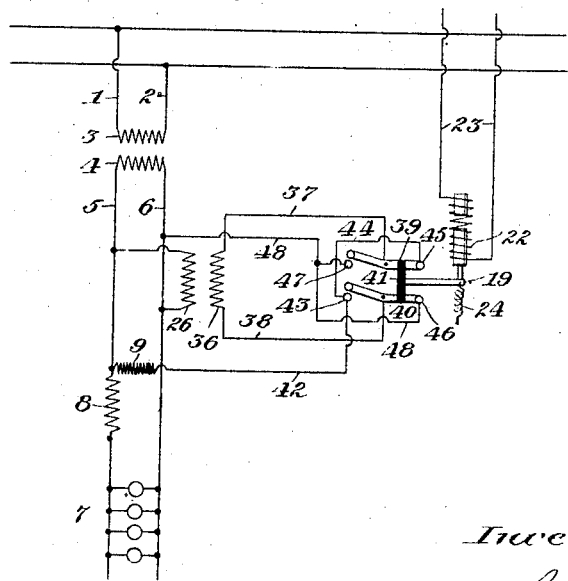

Referring to the accompanying drawing—Figure 1 is a diagrammatic view of the lighting-system and meter of an individual consumer, with means, including an auto-transformer having an intermediate tap, for decreasing the voltage impressed on the meter shunt-coil to one-half its normal value; Fig. 2 is a diagrammatic view of an individual lighting-system and meter, with means, including a double-wound transformer with an intermediate secondary tap, for either increasing or decreasing the voltage normally impressed on the meter shunt-coil; and Fig. 3 is a diagrammatic view of a similar lighting-station, with a modified means, including a transformer and a double-pole double-throw switch, for increasing or decreasing the voltage applied to the meter shunt-coil.

Fig. 1 illustrates an individual lighting-station having mains 1, 2 connected to the primary 3 of a transformer, the secondary 4 of which has leads 5, 6 carrying current to the lamps or other translating devices 7. The series-coil 8 of the induction-meter is interposed in the lead 5, and the shunt-coil 9 of the meter is normally connected across the leads 5, 6. The terminals of an auto-transformer 10 are also connected across these leads 5, 6, by wires 11, 12. The wire 12 extends past the transformer-winding 10 to a switch-point 13. From about the middle of the transformer-winding 10 a wire 14 extends to a second switch-point 15. A single-pole double-throw switch 16 is pivoted at an intermediate point 17, to which is connected a wire 18 extending to one end of the shunt-coil 9. Rigidly connected to the switch-arm 16 is a lever 19, to the outer end of which is secured a link 20 connected to the plunger-armature 21 of an electromagnet 22. The winding of this electromagnet is connected by leads 23 to some central control-point, for example the power-plant. A tension-spring 24 is also connected to the end of the lever 19, acting in opposition to the pull of the plunger 21.

When the switch 16 is in the position illustrated, resting on the switch-point 13, the normal line voltage is impressed on the meter shunt-coil 9, by the lead 5 directly connected to one of its ends and the lead 6 indirectly connected to its other end through the wires 12 and 18. When, however, the electromagnet 22 is energized from the central control-point, the switch-arms are thrown to open the circuit at the switch-point 13 and close it on the switch-point 15, thereby opening the normal circuit of the shunt-coil and including this coil in a circuit comprising one-half only of the transformer-winding 10. The voltage impressed on the shunt-coil is thereby cut in half and the rate and reading of the meter are correspondingly decreased. In practice, it is sometimes necessary that the tap 14 should extend from a point near but not exactly at the middle of the winding 10, depending upon the characteristics of the particular meter employed. A short secondary transformer-winding 25 may be placed in proximity to the winding 10, to serve as a source of low-voltage current for ringing house-bells and other purposes.

Fig. 2 illustrates an individual lighting-station also having supply mains 1 and 2, a supply-transformer with windings 3, 4, leads 5, 6 extending to the translating devices 7, and a meter having a series coil 8 interposed in the lead 5 and a shunt-coil 9. The primary 26 of a double-wound transformer is connected across the leads 5, 6. One end of the secondary winding 27 of this transformer is connected by a wire 28 to a switch-point 29, and its other end is connected by a wire 30 to another switch-point 31. From the middle of this secondary winding a wire 32 extends to one end of the meter shunt-coil 9, the other end of this shunt-coil being directly connected to the lead 5. A switch 33, pivoted at its middle point 34, is arranged to bear alternately on the contacts 29 or 31, and is itself connected to the main 6 by a wire 35. This switch, like that illustrated in Fig. 1, has an actuating-lever 19 connected to the plunger-armature 21 of an electromagnet 22 in a control-circuit 23, a spring 24 acting in opposition to the electromagnet. When the switch is in the position illustrated, being closed on point 31, the voltage impressed on the meter shunt-coil 9 is but one-half the normal line voltage, being the difference of the line voltage itself and the opposed half-line-voltage induced in that part of the transformer secondary-winding 27 between the wires 30 and 32. When, however, the electromagnet 22 is energized and the switch is thrown off the point 31 and onto the point 29, the voltage impressed on the meter shunt-coil is one and one-half times the line voltage, being the line voltage itself plus the half-line-voltage induced in that portion of the secondary transformer-winding 27 between the leads 28 and 32. By shifting the switch, the meter is thus caused to register at three times its normal rate.

Fig. 3 illustrates a lighting station having the same leads, supply-transformer and meter coils as are shown in Figs. 1, 2, the series coil 8 being interposed in the lead 5. The primary coil 26 of a double-wound transformer is also bridged across the leads 5, 6. The ends of the secondary coil 36 of this transformer are connected by wires 37, 38 to the arms 39, 40 of a double-pole double-throw switch. These two arms are rigidly connected by a bar 41 of insulating material, to which is secured an actuating-lever 19 controlled by the plunger of an electromagnet 22 and by a spring 24, as heretofore. One end of the meter shunt-coil 9 is directly connected to the lead 5 and its other end is connected by a wire 42 to a switch-point 43 controlled by the arm 40; also, by a wire 44 leading from the switch-point 43, to a switch-contact 45 controlled by the arm 39. The other two switch-contacts 46, 47 are connected by a wire 48 to the lead 6. By this control-mechanism, the entire voltage induced in the transformer-winding 36 is added to or subtracted from the normal line voltage impressed on the meter shunt-coil 9, depending on the position of the switch-arms 39, 40, as controlled by the circuit 23 of the electromagnet 22.

I claim:

1. In combination with a recording electric induction watt-meter having current and potential coils, means for varying the normal line-voltage impressed on the potential coil and thereby varying the meter-rate, said means comprising a transformer shunted across the line and having variable connections to said potential coil.

2. In combination with a recording electric induction watt-meter having current and potential coils, means for varying the normal line-voltage impressed on the potential coil and thereby varying the meter-rate, said means comprising a transformer shunted across the line and having variable connections to said potential coil, controlled by a separate circuit.

In testimony whereof I affix my signature in presence of two witnesses.

ALFRED W. BURKE.

Witnesses:
EUGENE A. BYRNES,
C. W. FOWLER.

Copies of this patent may be obtained for five cents each, by addressing the "Commissioner of Patents, Washington, D. C."